United States Patent [19]

Tamura

[11] Patent Number: 5,257,450
[45] Date of Patent: Nov. 2, 1993

[54] AUTOMOBILE WINDSHIELD MOLDING MEMBER AND METHOD OF MANUFACTURING THE SAME

[75] Inventor: Tatsuya Tamura, Yokohama, Japan

[73] Assignee: Hashimoto Forming Industry Co., Ltd., Japan

[21] Appl. No.: 2,669

[22] Filed: Jan. 11, 1993

Related U.S. Application Data

[62] Division of Ser. No. 859,804, Mar. 30, 1992, Pat. No. 5,193,875.

[30] Foreign Application Priority Data

Mar. 29, 1991 [JP] Japan .................. 3-067078

[51] Int. Cl.$^5$ ............................................. B23P 17/00
[52] U.S. Cl. .................................................. 29/527.1
[58] Field of Search ............... 72/379.2; 52/208, 400; 296/93, 208, 213; 29/527.1

[56] References Cited

U.S. PATENT DOCUMENTS

| | | |
|---|---|---|
| 4,757,660 | 7/1988 | Miyakawa et al. |
| 4,865,676 | 9/1989 | Kimura et al. |
| 4,865,796 | 9/1989 | Tamura et al. |
| 4,968,543 | 11/1990 | Fujioka et al. |
| 5,009,460 | 4/1991 | Iwata et al. |
| 5,061,335 | 10/1991 | Tamura et al. |
| 5,070,590 | 12/1991 | Fujioka et al. |
| 5,074,610 | 12/1991 | Tamura et al. |
| 5,104,173 | 4/1992 | Tamura et al. |
| 5,107,646 | 4/1992 | Tamura. |
| 5,112,547 | 5/1992 | Nakashima et al. |

FOREIGN PATENT DOCUMENTS

| | | |
|---|---|---|
| 3813894 | 2/1990 | Fed. Rep. of Germany. |
| 4034432 | 5/1991 | Fed. Rep. of Germany. |
| 2219338 | 12/1989 | United Kingdom. |

*Primary Examiner*—Lowell A. Larson
*Attorney, Agent, or Firm*—Stevens, Davis, Miller & Mosher

[57] ABSTRACT

A molding member includes an elongate pre-shaped main body of initially constant cross-section, with upper and side portions to continuously extend along respective edges of an automobile windshield plate. The main body covers a gap between the windshield plate and an automobile body panel, and has a reference point which is more spaced from the outer surface of the windshield plate along the side portion than along the upper portion. A lip section of the main body can be maintained in contact with the outer surface of the windshield plate along the upper portion with a first angle, and spaced therefrom along the side portion with a second, less steep angle. A weir of a refined appearance, with desired cross-sectional area or height is defined along the side portion, between the windshield plate and the lip section, and prevents water on the windshield plate from flowing across the molding member.

4 Claims, 7 Drawing Sheets

FIG_1

FIG_2

FIG_3

FIG_4

FIG_5

FIG_6

FIG_7

FIG_8

FIG_9

FIG_10

FIG_11

FIG_12

FIG_13

FIG_14

FIG_15

FIG_16

FIG_17

AUTOMOBILE WINDSHIELD MOLDING MEMBER AND METHOD OF MANUFACTURING THE SAME

This is a divisional of application Ser. No. 07/859,804 filed Mar. 30, 1992, now U.S. Pat. No. 5,193,875 granted Mar. 16, 1993.

BACKGROUND OF THE INVENTION

1. Field of the Invention

The present invention relates to a molding member for an automobile windshield plate, having a cross-section which varies in the longitudinal direction of the molding member, with reference to the windshield plate.

2. Description of the Related Art

An automobile generally employs various kinds of window molding member which extends along the periphery of a windshield plate or a rear window plate, i.e. along a front or rear edge of a roof panel of the automobile body and a pair of front or rear pillars. Typically, the molding member is composed of an elongate main body for covering a gap between the windshield plate and an adjacent automobile body panel. The main body includes a lip section projecting laterally toward the outer surface of the windshield plate on its periphery, and a leg section projecting toward the gap for retaining the molding member in place when it is in use.

A variety of requirements are imposed on such molding members mainly from design and/or functional viewpoint, and resulted in progressively increased demand in the automobile industry for an improved molding member for a windshield plate, with a cross-section which varies in the longitudinal direction of the molding member. Thus, a recent trend is to adopt a molding member having an upper portion of a first predetermined cross-section, at least one side portion of a second predetermined cross-section, and at least one transitional or corner portion for integrally and continuously connecting the upper and side portions with each other.

When such a molding member is arranged along the periphery of a windshield plate, the first cross-section of the upper portion contributes to realize a so-called flush surface of the automobile body, and the second cross-section of the side portion serves to define a weir along the side edge of the windshield plate. During driving in rainy conditions, the weir serves to prevent rain water on the windshield plate from flowing across the side portion of the molding member, toward an adjacent side window, and to thereby effectively preserve driver's and/or navigator's sight through the side window. Therefore, the weir should have an increased cross-sectional area or height, from a functional viewpoint. However, there may be instances wherein known molding members could not readily cope with often ambivalent problems of achieving the intended function while simultaneously satisfying diverse ornamental design requirements.

For example, Japanese Patent Application Laid-open Publication No. 62-283,017 discloses one embodiment of the molding member wherein the lip section has a tip end which is in contact with the windshield plate along the upper portion and spaced therefrom along the side portion for defining a channel-like weir of the molding member. This type of the molding member may have an increased cross-sectional area of the weir by forming the lip section to project from the automobile body panel with an increased amount. However, an excessive projection of the lip section often results in that the interior of the molding member becomes visible from outside, degrading the appearance of the weir as the case may be. From esthetic viewpoint, it may be required to reduce the cross-sectional area of the weir and maintain a refined appearance, although such a weir would not ensure the intended function to be properly achieved.

Japanese Patent Application Laid-open Publication No. 63-93,618 discloses another embodiment of the molding member which includes a weir-forming element in the form of a longitudinal ridge on the lip section, extending along the side portion of the molding member. Furthermore, Japanese Patent Application Laid-open Publication No. 1-269,612 or applicant's co-pending U.S. patent application Ser. No. 603,551 filed Oct. 26, 1990 (now abandoned) discloses still another embodiment wherein the molding member includes a different type of weir-forming element along the side portion of the molding member, which is formed as a bank- or dam-like area of the leg section under the lip section.

In these instances, when it is required for the weir to have an increased height to stably collect and guide water on the windshield plate, the height of adjacent automobile body panel also needs be increased by a corresponding amount. However, the height of the body panel cannot always be increased by a desired amount in terms of the intended function of the weir, due to diverse ornamental design requirements and/or technical difficulties as related to press technology or the like, for producing the body panel. Here also, a weir with insufficient height would not ensure the intended function to be properly achieved.

SUMMARY OF THE INVENTION

It is therefore a primary object of the present invention to provide a novel and improved molding member for an automobile windshield plate, having a higher degree of freedom in respect of functional and ornamental design, and providing an excellent function of the weir without accompanying the possible problems as discussed above.

Briefly stated, the present invention provides a molding member which comprises an elongate main body including upper and side portions to continuously extend along upper and side edges of the windshield plate, respectively, and a corner portion integrally and continuously connecting the upper and side portions with each other. The main body serves to cover a gap between the windshield plate and an adjacent automobile body panel, and further includes a lip section to project toward a widthwise center region of the windshield plate, and a leg section to project in a direction substantially perpendicular to a relevant outer surface portion of the windshield plate and having means for retaining the molding member in place.

According to the invention, the main body has a reference point to be located adjacent to the automobile body panel, which is spaced from the outer surface of the windshield plate when the molding member is in use, by a first distance along the upper portion and by a second, relatively greater distance along the side portion. The lip section has a tip end which can be brought into contact with the outer surface of the windshield plate along the upper portion and spaced therefrom along the side portion, when the molding member is in use. Furthermore, the lip section defines a first angle along the upper portion and a second, less steep angle along the side portion, relative to the opposite outer surface portions of the windshield plate when the molding member is in use. The leg section has means cooperating with the lip section for defining a weir along the side portion when the molding member is in use, between the outer surface of the windshield plate and the lip section. The weir serves to prevent water from flowing across the molding member and collect and guide the water along the weir.

The present invention contemplates to form a functionally excellent weir in a unique manner, by means of a predetermined spatial relationship of the main section relative to the windshield plate, in combination with a specifically defined angular relationship of the lip section relative to the outer surface of the windshield plate. Thus, it is readily possible to realize a weir of a sufficient cross-sectional area or height, without difficulties in terms of ornamental design requirements and/or press technology for producing the automobile body panel.

According to one embodiment, the elongate main body is pre-subjected to such a bending that the upper and side portions have contours corresponding respectively to those of the upper and side edges of the windshield plate, to form a molding member with a desired curvature. As an alternative embodiment, the molding member may have a straight initial shape, and may be subjected to such a bending before or when mounting it in place, for deforming the upper and side portions to have contours corresponding respectively to those of the upper and side edges of the windshield plate.

Furthermore, the lip section may be pre-subjected to such a plastic deformation that, when the molding member is in use, the tip end is in contact with the outer surface of the windshield plate along the upper portion and spaced therefrom along the side portion.

The leg section may have a recess which is engageable with the edge of the windshield plate, for maintaining a predetermined spatial relationship of the molding member relative to the windshield plate when the molding member is in use.

According to another aspect of the invention, there is provided a method of manufacturing a molding member of the abovementioned structural features, basically comprising the following three steps.

The first step is to prepare an elongate pre-shaped member of a longitudinally constant cross-section, corresponding to the main body and including a lip section to project toward an outer surface of the windshield plate, and a leg section to project toward the gap.

Subsequently, the lip section is plastically deformed to thereby form the upper and side portions of the main body such that the lip section has a tip end which can be maintained in contact with the outer surface of the windshield plate along the upper portion and spaced therefrom along the side portion, when the molding member is in use. In this instance, the lip section may be subjected to such a deformation that, when the molding member is in use, the lip section defines a first angle along the upper portion, and a second, less steep angle along the side portion relative to the outer surface of the windshield plate.

Moreover, the leg section is provided with means for maintaining a predetermined spatial relationship of the molding member relative to the windshield plate when it is in use, such that a reference point in the main section adjacent to the automobile body panel is spaced from the outer surface of the windshield plate by a first distance along the upper portion and by a second, relatively greater distance along the side portion. In this instance, the leg section may be formed with a recess to be engaged by the edge of the windshield plate, for maintaining the spatial relationship of the molding member relative to the windshield plate.

Furthermore, the elongate pre-shaped member may be subjected to such a bending that the upper and side portions are deformed to have contours corresponding respectively to those of the upper and side edges of the windshield plate.

It has to be noted that these steps, except the initial formation of the elongate pre-shaped member, may be carried out at any sequence as desired. For example, the plastic deformation of the lip section may be carried out at any sequence; i.e., simultaneously with, before or after the bending of the pre-shaped member.

The present invention will now be explained in further detail, with reference to some preferred embodiments shown in the attached drawings.

DETAILED DESCRIPTION OF THE PREFERRED EMBODIMENTS

Referring now to FIGS. 1-4, there is shown a molding member 1 according to a first embodiment of the present invention, which is arranged along the periphery of an automobile windshield plate 2. The molding member 1 includes an upper portion 1a and at least one side portion 1b to be engaged with upper and side edges 2a, 2b of the windshield plate 2, respectively. The molding member 1 further includes at least one corner or transient portion 1c for integrally and continuously connecting the upper and side portions 1a, 1b with each other along a corner edge of the windshield plate 2.

Figure 2:
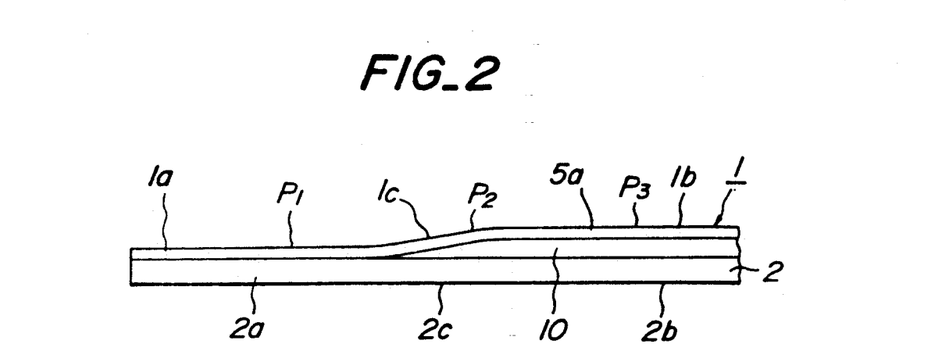
FIG. 2 is a schematic view showing the relationship between the windshield plate and the molding member as seen in the direction of arrows P1, P2 and P3 in FIG. 1.

A gap is left between the windshield plate 2 and an adjacent automobile body panel 3, which is covered by an elongate main body 4 of the molding member 1. The main body 4 includes a lip section 5a on the side of the windshield plate 2, which projects toward a widthwise center region of the windshield plate 2 to cover its outer peripheral surface region. As will be more fully explained hereinafter, the lip section 5a has a free edge which is maintained in contact with the outer surface of the windshield plate 2 along the upper portion 1a, and spaced therefrom along the side portion, when the molding member 1 is in use (FIG. 2).

The main body 4 includes another lip section 5b on the side of the body panel 3, having a tip end which can be maintained in contact with the outer surface of the body panel 3.

The main body 4 may be composed of a natural or synthetic rubber. Advantageously, however, the main body 4 is composed of a suitable thermoplastic and elastomeric synthetic resin material with flexibility, such as plasticized polyvinylchroride (PVC) resin, ionomer resin, ethylenevinyl acetate (EVA) resin, transparent cellulose acetate butylate (CAB) resin, etc.

The main body 4 can be formed by extruding such synthetic resin material into a desired cross-section which is initially constant throughout the entire length. In this case, a plastically deformable core element 6 in the form of a metal strip may be co-extruded with the synthetic resin material so as to be embedded in the main body 4. The core element 6 may be partly exposed outside as an ornamental portion with a metallic luster or a desired color.

Figure 3:
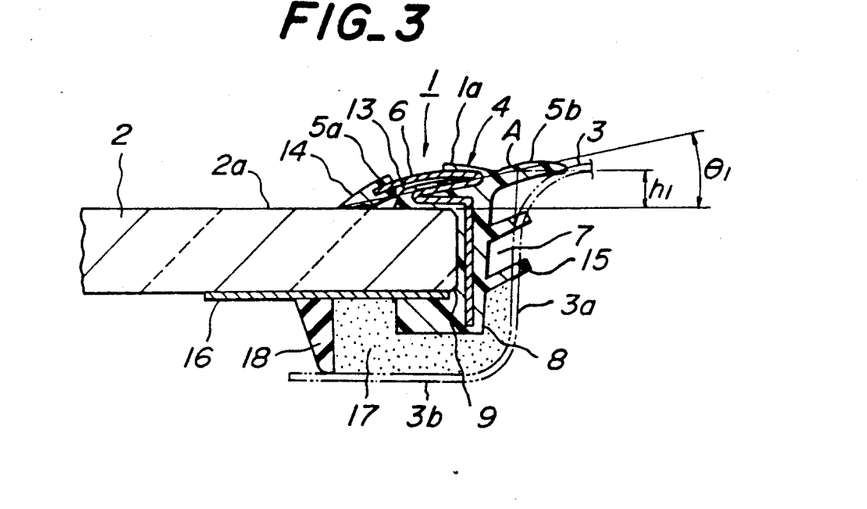
FIGS. 3 and 4 are sectional views taken along the lines III—III and IV—IV in FIG. 1, respectively, showing the upper and side portions of the molding member according to a first embodiment of the invention.
Figure 4:
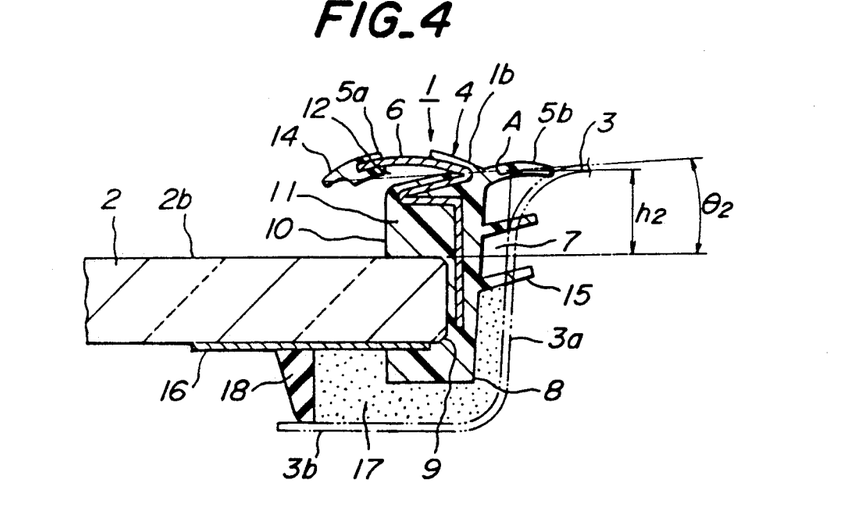

As particularly shown in FIGS. 3 and 4, the main body 4 of the molding member 1 further includes a leg section 8 which projects in a direction substantially perpendicular to the relevant outer surface portion of the windshield plate 2, and further extends into the gap 7 between the windshield plate 2 and adjacent body panel 3. The leg section 8 is formed with a groove-like recess 9 which is engaged by the peripheral edge of the windshield plate 2.

The main body 4 has a predetermined reference point A on its top region adjacent to the body panel 3, which is spaced from the outer surface of the windshield plate 2 by a first distance $h_1$ along the upper portion 1a and by a second, relatively greater distance $h_2$ along the side portion 1b. Typically, the distance $h_1$ along the upper portion 1a is within a range of 10-20 mm, preferably 12-17 mm, while the distance $h_2$ along the side portion 1b is within a range of 15-30 mm, preferably 17-25 mm.

A weir 10 is formed by an area 11 of the leg section 8 along the side portion 1b of the molding member 1, on the lower side of the main body 4 (FIG. 3). The weir 10 defines an inner space between the outer surface of the windshield plate 2 and the lip section 5a on the side of the windshield plate 2, which serves to collect and guide water on the windshield plate 2 and prevent the water from flowing across the molding member 1.

The lip section 5a on the side of the windshield plate 2 is pre-subjected to a permanent plastic deformation so that it has a first cross-section along the upper portion 1a and a second cross-section along the side portion 1b, which are slightly different from each other. The plastic deformation of the lip section 5a can be assisted by the plastically deformable core element 6 within the main body 4.

In the side portion 1b of the molding member 1, the lip section 5a on the side of the windshield plate 2 is opposed to the weir-forming area 11 of the leg section 8 to define a channel 12 which is in communication with the inner space of the weir 10 (FIG. 4).

In the upper portion 1a of the molding member 1, the lip section 5a is provided with a projection 13 which is in engagement with an opposite region of the main body 4 to minimize the distance d1 or the height of the molding member 1 in the upper portion 1a, thereby contributing to readily realize a flush surface of the automobile body near the upper portion 1a.

The lip section 5a along its free edge is provided with a longitudinally continuous tip end element 14. As particularly shown in FIGS. 3 and 4, due to the the plastic deformation of the lip section 5a, the tip end element 14 can be maintained in contact with the outer surface of the windshield plate 2 along the upper portion 1a, and spaced therefrom along the side portion 1b.

An imaginary line passing through the reference point C and the tip end element 14 forms a first angle $\theta_1$ along the upper portion 1a and a second, less steep angle $\theta_2$ along the side portion 1b, with reference to the relevant outer surface portions of the windshield plate 2 opposite to the tip end element 14. Typically, the first angle $\theta_1$ along the upper portion 1a is within a range of 10° to 30°, preferably 10° to 20°, while the second angle $\theta_2$ is within a range of 15° to −30°, preferably 10° to −20°.

As shown in FIGS. 3 and 4, the leg section 8 of the main body 4 includes engaging fins 15 which are in engagement with a shoulder portion 3a of the body panel 3. Furthermore, the periphery of the windshield plate 2 on its rear side is provided with an opaque printed layer 16, and secured to a flange portion 3b of the body panel 3 by an adhesive agent 17, with a dam rubber 18 therebetween.

As shown in FIG. 2, the lip section 5a of the main body 4 on the side of the windshield plate 2 typically begins to be spaced from the windshield plate in the corner portion 1c, though such an arrangement is not a prerequisite condition. Thus, the location where the lip section 5a begins to be spaced from the windshield plate may be that location of the upper portion 1a or side portion 1b which is adjacent to the corner portion 1c. Also, the distance between the lip section 5a and the windshield plate 2 along the side portion 1b need not be constant, and may increase toward the longitudinal end region of the molding member 1.

Figure 5:
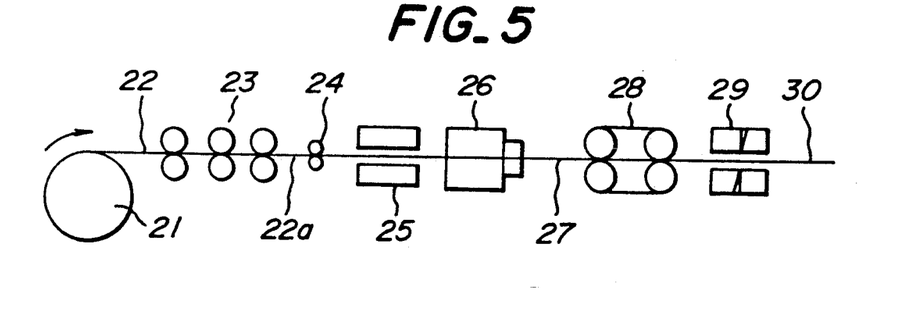
FIG. 5 is a schematic view of one example of production line, explaining the manufacturing steps of the molding member.

The molding member 1 of the abovementioned structure can be basically manufactured by a process to be particularly explained hereinafter with reference to FIG. 5.

First of all, an uncoiler 21 is provided which is to feed a metal strip material 22 to a roll forming machine 23, which is then shaped by the roll forming machine into a profiled body 22a having a desired cross-section of the core element 6. The profiled body 22a is further applied with an adhesive agent by a roll coater 24, subjected to baking of the adhesive agent by a heater 25, and then fed to an extruder 26.

When a profiled body which has been previously roll-formed or press-braked and cut into a predetermined length, or an aluminum profiled body is fed to the extruder 26 as the core element 6, instead of the originally non-profiled metal strip 22 from the uncoiler 21, the roll forming machine 23 may be replaced by an appropriate feeding device adapted to feed the profiled body to the extruder 26.

A thermoplastic synthetic resin material is co-extruded from the extruder 26 as an extruded body 27, together with the profiled body 22a. The extruded body 27 is cooled at a cooling station (not shown), hauled by a hauling device 28 and then cut by a cutter 29 into a predetermined length to form a pre-shaped member 30 having a cross-section as shown in FIG. 6, which is initially constant throughout the entire length.

Figure 6:
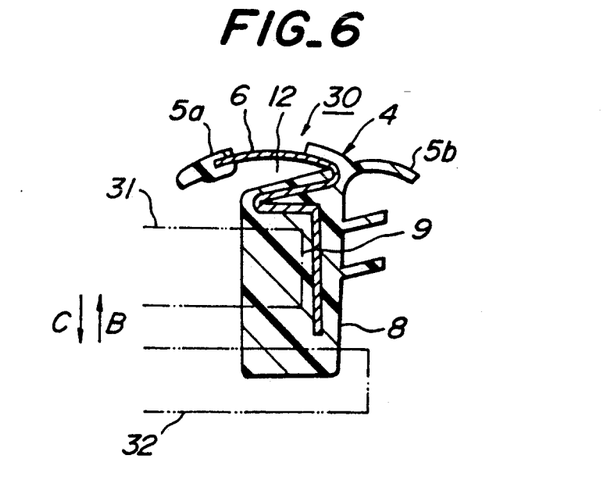
FIG. 6 is a sectional view of an elongate pre-shaped body.

Subsequently, as shown in FIG. 6, an end mill or the like cutter 31 is moved relative to the pre-shaped member 30 in the longitudinal direction, so as to remove the material locally from the pre-shaped member 30 and thereby form the recess 9 in the leg section 8, which extends continuously in the longitudinal direction of the pre-shaped member 30.

Depending upon the length of the leg section 8 of the main body 4, the free end of the leg section 8 may interfere with the flange portion 3b of the automobile body panel 3, in the upper portion 1a of the molding member 1. If such is the case, another cutter 32 is used to cut away the free end region of the leg section 8 in the upper portion 1a of the molding member 1, at an appropriate location indicated in FIG. 6, while avoiding an interference of the cutter 32 with the core element 6.

Thus, for the upper portion 1a of the molding member 1, the cutters 31 and 32 are simultaneously advanced toward the lip section 5a, i.e., in the direction indicated by arrow B in FIG. 6, to form the recess 9 and remove the free end region of the leg section 8. Furthermore, for the side portion 1b of the molding member 1, the cutters 31 and 32 are simultaneously moved back away from the lip section 5a, i.e., in the direction indicated by arrow C in FIG. 6, to form the recess 9 alone, without removing the free end region of the leg section 8.

Figure 7:
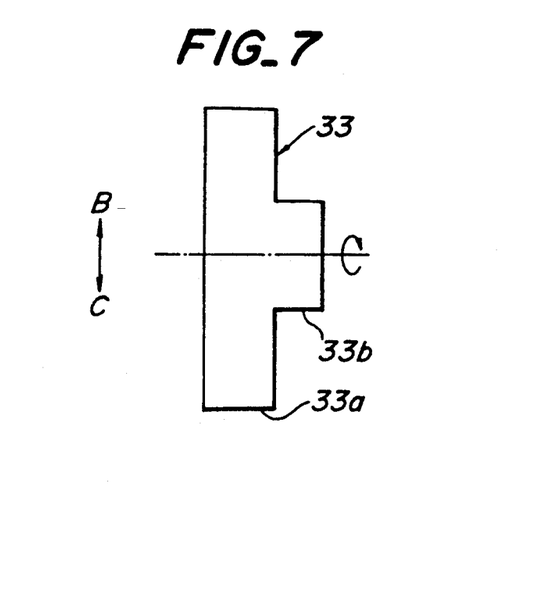
FIG. 7 is a schematic view showing the contour of a combined cutter member.

Instead of two separate cutter members 31 and 32 as mentioned above, a combined end-mill type cutter member 33 as shown in FIG. 7 may be used. This cutter member 33 includes a large diameter portion 33a for forming the recess 9 in the leg section 8, and a small diameter portion 33b projecting axially from the large diameter portion 33a for removing the free end region of the leg section 8 in the upper portion 1a of the pre-shaped member 30. The recess 9 formed by the large diameter portion 33a of the combined cutter member 33 has a substantially inverted L-shaped cross-sectional contour.

When the free end region of the leg section 8 need not be removed, it is of course unnecessary to use the cutter member 32 or 33; in such a case, only what is required is to use the cutter member 31 and form the recess 9 in the leg section 8. Furthermore, depending upon the situation, a planer type cutter member may be used to form the recess 9, instead of the abovementioned end-mill type cutter member.

Figure 8:
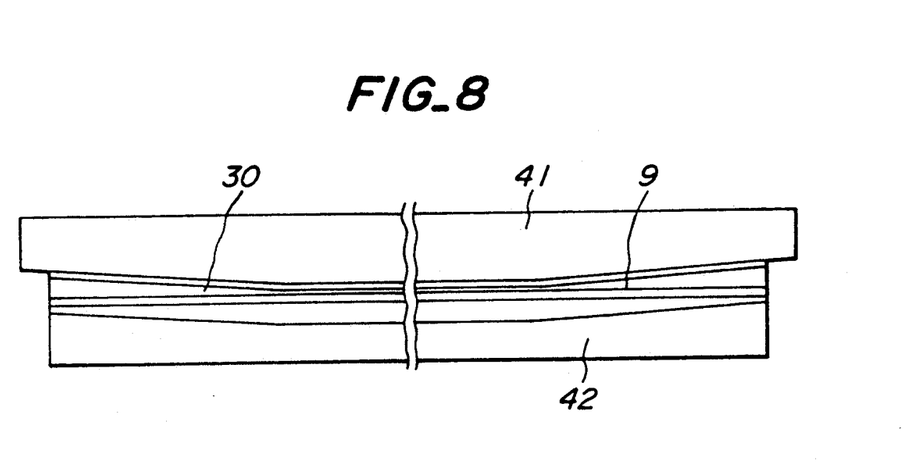
FIG. 8 is a front view showing one method of forming a recess in the leg section.
Figure 9:
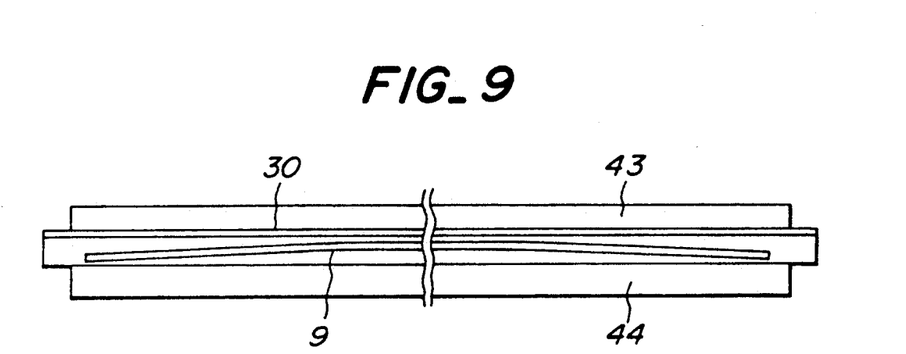
FIG. 9 is a front view showing another method of forming a recess in the leg section.

FIGS. 8 and 9 show examples of the method for forming a recess 9 in the leg section 8 of the main body 4, without removing the free end region of the leg section 8.

In the example shown in FIG. 8, the pre-shaped member 30 is clamped by, and between a pair of die plates 41, 42 each having a clamping surface which is a combination of a horizontal surface portion and inclined surface portions on both sides thereof. Due to the particular configuration of the clamping surface afforded to the die plates 41, 42, the pre-shaped member 30 as clamped has a longitudinal axis which is deflected in accordance with the clamping surface. The cutter member 31 is moved along a straight path relative to the pre-shaped member 30 to remove material from the leg section 8 and form the recess 9 therein.

Furthermore, in the example shown in FIG. 9, the pre-shaped member 30 is clamped by, and between a pair of die plates 43, 44 each having a flat clamping surface. Thus, the pre-shaped member 30 as clamped has a longitudinal axis which is straight. The cutter member 31 is moved relative to the pre-shaped member 30, along a predetermined path including a horizontal path portion and inclined path portions on both sides thereof, to remove material from the leg section 8 and form the recess 9 therein.

Subsequently, the lip section 5a of the pre-shaped member 30 to be arranged in the side of the windshield plate 2 is subjected to a permanent plastic deformation by a press operation, in accordance with the desired difference in cross-section for the upper and side portions 1a, 1b of the molding member 1.

To this end, the lip section 5a of the pre-shaped member 30 in the upper portion 1a of the molding member 1 may be deformed and deflected toward the leg section 8 so that the the channel 12 behind the lip section 5a disappears and the tip end element 14 is maintained in contact with the windshield plate 2 in the upper portion 1a when the molding member 1 is in use.

Alternatively, the lip section 5a of the pre-shaped member 30 in the side portion 1b of the molding member 1 may be deformed and deflected away from the leg section 8 so that the channel 12 is formed behind the lip section 5a and the tip end element 14 is maintained spaced from the windshield plate 2 in the side portion 1b when the molding member 1 is in use.

Still another possibility is to deform and deflect the lip section 5a of the pre-shaped member 30 toward the leg section 8 along the upper portion 1a of the molding member 1, and away from the leg section 8 along the side portion 1b.

When the molding member 1 does not include the plastically deformable core element 6 embedded therein, the plastic deformation of the lip section 5a can be carried out while the thermoplastic synthetic resin material forming the lip section 5a is heated and softened. It should be noted, however, that such heating and softening of the synthetic resin material may also serve to assist the plastic deformation of the lip section 5a, even when the core element 6 is embedded in the main body 4 of the molding member 1.

The abovementioned plastic deformation of the lip section 5a may be carried out before the formation of the recess 9 in the leg section 8, if necessary or preferred as the case may be.

When the molding member 1 does not include the core element 6 embedded therein, the pre-shaped body 30 after the formation of the recess 9 in the leg section 8 and the plastic deformation of the lip section 5a constitutes by itself the molding member 1 as the final product, which can be directly mounted in place by bending the molding member 1 so that the upper, side and corner portions 1a, 1b, 1c of the molding member 1 are deformed to have contours corresponding to those of the upper, side and corner edges 2a, 2b, 2c of the windshield plate 2, respectively.

When, on the other hand, the molding member 1 includes the core element 6 embedded therein, it is necessary to bend the pre-shaped body 30 in advance so that the upper, side and corner portions 1a, 1b, 1c of the molding member 1 are deformed to have contours respectively corresponding to those of the upper, side and corner edges 2a, 2b, 2c of the windshield plate 2. Even in this case, there may be instances wherein the molding member 1 is stocked, sold or transported in a straight state, to be eventually subjected to the bending before it is mounted in place.

Figure 10:
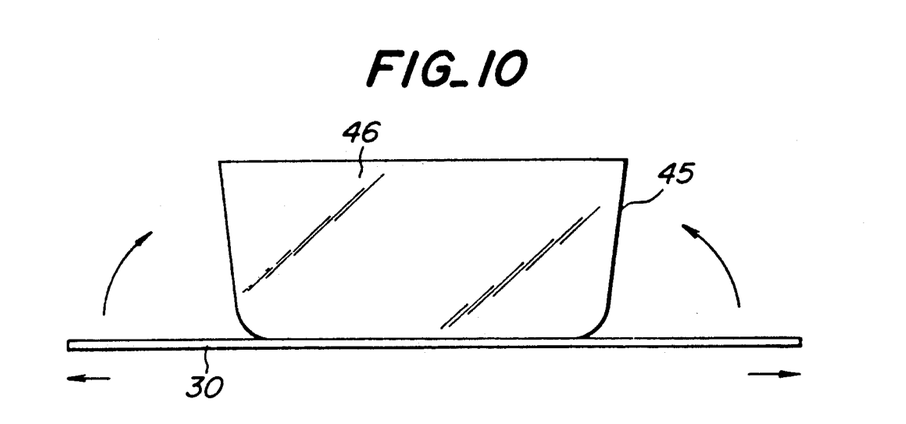
FIG. 10 is a plan view showing the manner of bending the molding member.

The bending of the pre-shaped member 30 can be carried out by any appropriate method, such as a so-called stretch bending method wherein the pre-shaped member 30 is axially stretched and simultaneously urged against an outer peripheral surface 45 of a bending die plate 46 having a contour which corresponds to that of the windshield plate 2.

Generally, the bending of the pre-shaped member 30 may be carried out at any sequence, i.e., before, after, or simultaneously with the formation of the recess 9 in the leg section 8 and/or plastic deformation of the lip section 5a. However, particularly when the bending of the molding member 1 tends to adversely affect the plastically deformed shape of the lip section 5a, the bending of the pre-shaped member 30 is preferably carried out before the plastic deformation of the lip section 5a.

Figure 1:
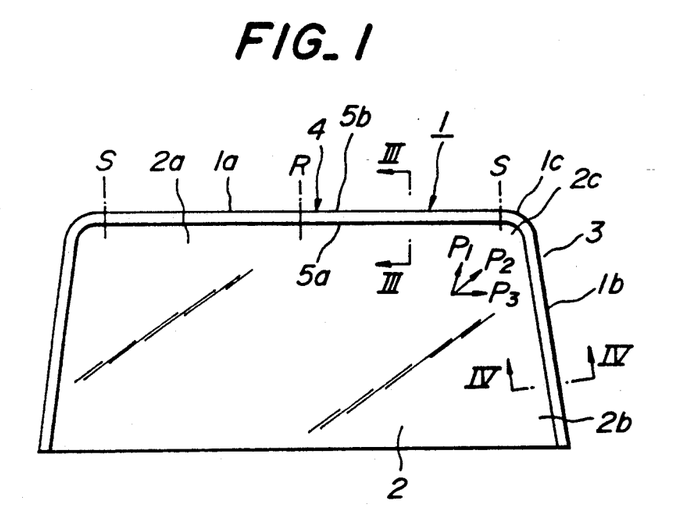
FIG. 1 is a front view of an automobile windshield plate to which the molding member according to the present invention may be applied.

The molding member 1 manufactured by the process including the bending of the pre-shaped member 30 has an overall configuration as shown in FIG. 1, and may be transported as it is. In order to minimize the space required for parts stock or transportation, however, the molding member 1 may be physically divided into a two-piece structure by cutting it at a center position R, or into a three-piece structure by cutting it at two side positions S, as shown in FIG. 1.

The molding member 1 is mounted in place by inserting the leg section 8 into the gap 7 between the windshield plate 2 and the body panel 3, so that the peripheral edge of the windshield plate 2 is engaged into the recess 9 in the leg section 8. Thus, the upper, side and corner portions 1a, 1b, 1c of the molding member 1 are arranged along the upper, side and corner edges 2a, 2b, 2c of the windshield plate 2, respectively.

When the molding member 1 is in use, the weir 10 is formed along the side portion 1b of the molding member 1 only, but not along the upper portion 1a. It is thus possible to readily realize a refined flush outer surface of the automobile body near the front edge of the roof panel. Furthermore, the weir 10 along the side portion 1b serves, during driving in rainy conditions, to prevent water on the windshield plate 2 from flowing across the molding member 1, by collecting and guiding the water to flow along the side edge 2b of the windshield plate 2. This makes it possible to effectively preserve the driver's and/or passenger's sight through adjacent side windows.

Figure 11:
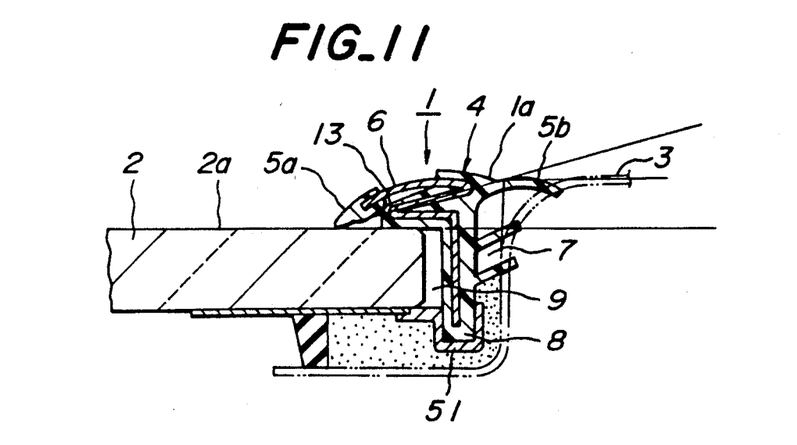
FIGS. 11 and 12 are sectional views respectively showing the upper and side portions of the molding member of a second embodiment of the invention.
Figure 12:
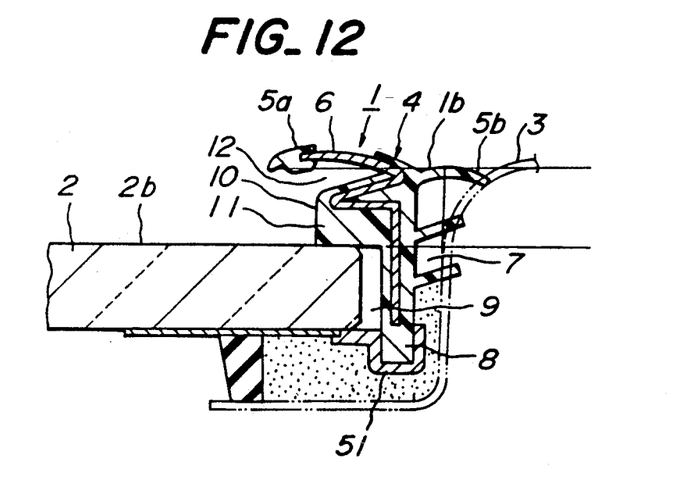
Figure 13:
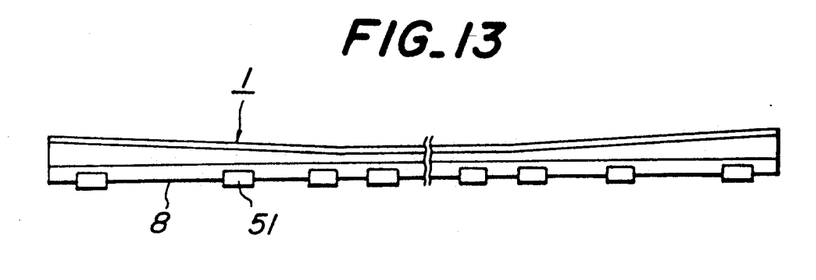
FIG. 13 is a front view of the molding member shown in FIGS. 11 and 12.

Another embodiment of the windshield molding member 1 according to the present invention is shown in FIGS. 11 and 12 which are similar to FIGS. 3 and 4, respectively. This embodiment differs from the previous one in that the leg section 8 of the main body 4 is formed with a cutout as the recess 9 of substantially inverted L-shaped cross-sectional contour, instead of a groove-like recess 9, and further in that a plurality of fittings 51 are secured to the free end of the leg section 8 so as to clamp the windshield plate 2 between the fittings 51 and the projection 13 or the weir-forming area of the leg section 8. The fittings 51 are longitudinally spaced from each other, as shown in FIG. 13, although a longitudinally continuous single fitting may be alternatively used.

Figure 14:
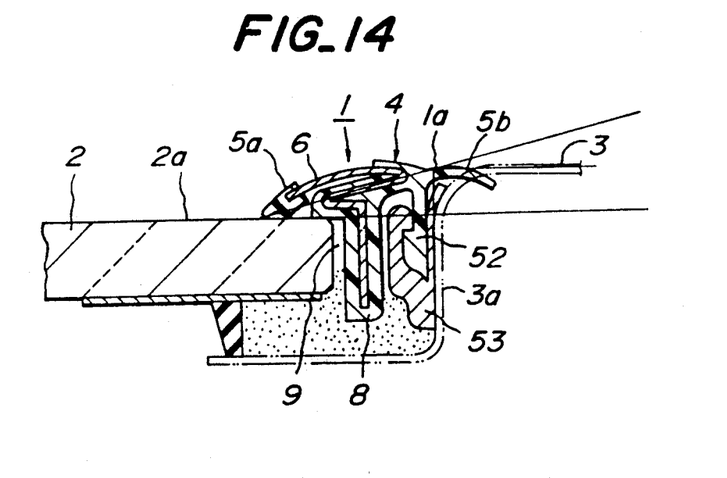
FIGS. 14 and 15 are sectional views respectively showing the upper and side portions of the molding member of a third embodiment of the invention.
Figure 15:
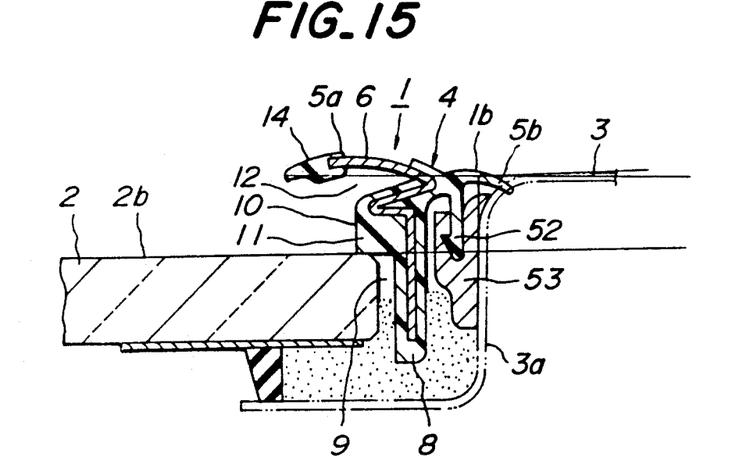

Still another embodiment of the windshield molding member 1 according to the present invention is shown in FIGS. 14 and 15 which are respectively similar to FIGS. 3 and 4, too. This embodiment differs from the previous embodiments in that the main body 4 is provided with a further leg section 52, and one or more fasteners 53 are secured to the shoulder portion 3a of the automobile body panel 3 by an adhesive agent, for example. The leg section 52 is engaged with the fasteners 53 to maintain the molding member 1 in place. Unlike in the previous embodiment, the molding member of this embodiment can be mounted in place by inserting the leg section 8 into the gap 7, after the windshield plate 2 has been secured onto the flange portion 3b of the body panel 3.

Figure 16:
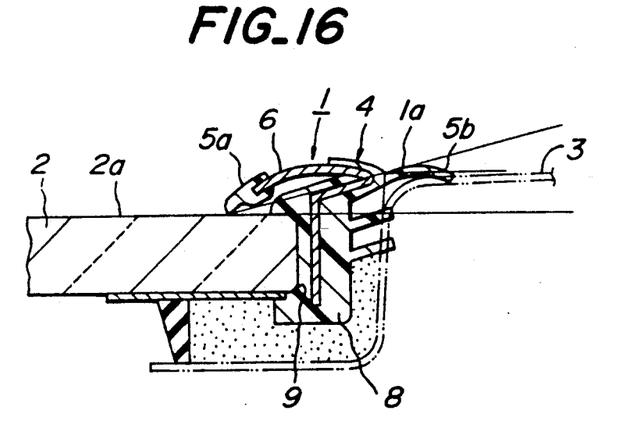
FIGS. 16 and 17 are sectional views respectively showing the upper and side portions of the molding member of a fourth embodiment of the invention.
Figure 17:
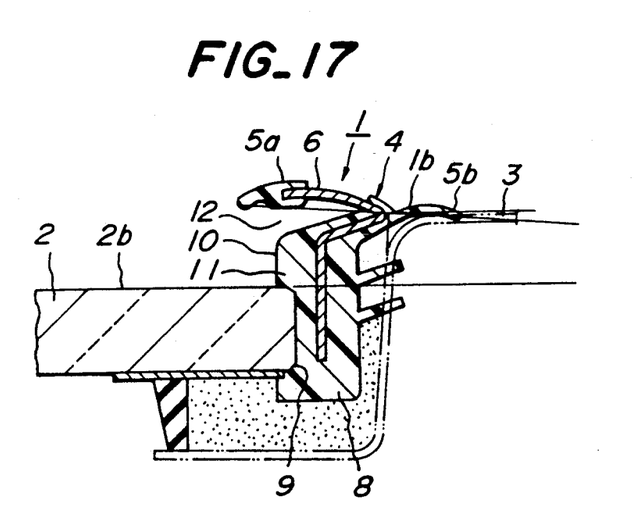

A further embodiment of the windshield molding member 1 according to the present invention is shown in FIGS. 16 and 17 which are respectively similar to FIGS. 3 and 4, too. This embodiment differs from the previous embodiments in that a plastically deformable core element 6 of a relatively simplified cross-sectional contour is embedded in the main body 4 of the molding member 1 so as to be partly exposed outside.

In these embodiments also, as in the embodiment of FIGS. 3 and 4, the main body 4 has a reference point (A) adjacent to the automobile body panel 3, which is spaced from the outer surface of the windshield plate 2 by a first distance ($h_1$) along the upper portion 1a and by a second, relatively greater distance ($h_2$) along the side portion 1b. The tip end element 14 of the lip section 5a is maintained in contact with the outer surface of the windshield plate 2 along the upper portion 1a and spaced therefrom along the side portion 1b. Furthermore, the lip section 5a defines a first angle ($\theta_1$) along the upper portion 1a and a second, less steep angle ($\theta_2$) along the side portion 1b, relative to the opposite outer surface portions of the windshield plate 2.

It will be appreciated from the foregoing detailed description that the present invention provides a novel and improved molding member for automobile windshield plate, with a higher degree of freedom in respect of functional and ornamental design. A predetermined spatial relationship of the molding member relative to the windshield plate, in combination with the specifically defined angular relationship of the lip section relative to the relevant outer surface portion of the windshield plate, makes it readily possible to realize a weir of a functionally sufficient cross-sectional area or height without difficulties in terms of ornamental design requirements and/or press technology for producing the automobile body panel.

It is of course that the present invention is not limited to the abovementioned specific embodiments only, and various modifications/alterations may be made without departing from the scope of the invention.

For example, the plastically deformable core member 6 may be completely embedded in the main body 4 of the molding member 1, without being partly exposed outside. When the channel 12 behind the lip section 5a in the side portion 1b of the molding member 1 tends to be readily deformed, as the lip section 5a happens to be applied with an external force in the direction toward the windshield plate 2, separate spacer elements may be inserted into the channel 12. Furthermore, the molding member 1 may include a main body 4 and a leg section 8 which are separately prepared pieces connected to each other either integrally or detachably.

I claim:

1. A method of manufacturing a molding member for an automobile windshield plate, said molding member comprising a main body for covering a gap between the windshield plate and an adjacent automobile body panel, including upper and side portions to continuously extend along upper and side edges of the windshield plate, respectively, and a corner portion integrally and continuously connecting the upper and side portions with each other, wherein the method comprises the steps of:

preparing an elongate pre-shaped member with a longitudinally constant cross-section, corresponding to said main body and including a lip section to project toward a widthwise center region of the windshield plate, and a leg section to project in a direction substantially perpendicular to a relevant outer surface portion of the windshield plate;

plastically deforming said lip section to thereby form said upper and side portions of the elongate member such that, when the molding member is in use, the lip section has a tip end which is in contact with the outer surface of the windshield plate along said upper portion and spaced therefrom along said side portion; and providing said leg section with means for maintaining a predetermined spatial relationship of the molding member relative to the windshield plate when the molding member is in use, such that a reference point in said main body adjacent to said automobile body panel is spaced from the outer surface of the windshield plate by a first distance along said upper portion and by a second, relatively greater distance along said side portion;

whereby said leg section defines a weir between the outer surface of the windshield plate and said lip section along the side portion of the elongate member, said weir serving to prevent water from flowing across the molding member and collect and guide the water along the weir.

2. The method as set forth in claim 1, further comprising the step of subjecting said pre-shaped member to such a bending that said upper and side portions have contours corresponding respectively to those of the upper and side edges of the windshield plate.

3. The method as set forth in claim 1, wherein said lip section is subjected to such a plastic deformation that said lip section defines a first angle along said upper portion and a second, less steep angle along said side portion, relative to respectively opposite outer surface portions of the windshield plate when the molding member is in use.

4. The method as set forth in claim 1, wherein said leg section is provided with a recess to be engaged by the edge of the windshield plate, said recess forming said means for maintaining the predetermined spatial relationship of the molding member relative to the windshield plate.

* * * * *